June 19, 1962 H. STEINRÖTTER ET AL 3,039,845
METHOD OF REGENERATING ABSORBENT SOLUTIONS
Filed April 17, 1959
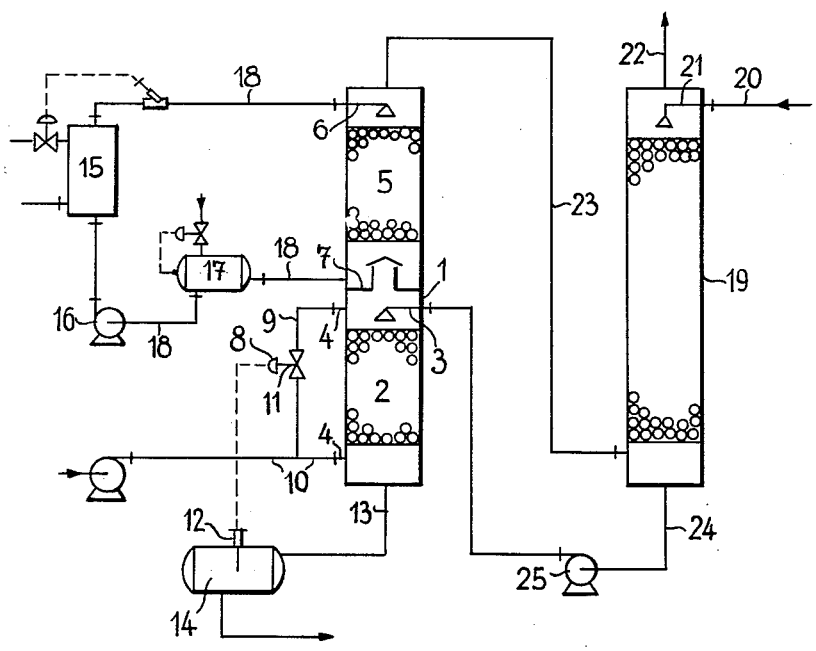
INVENTORS
*HEINZ STEINRÖTTER
HARALD LORENZ*
BY
*Curtis, Morris & Safford*
ATTORNEYS United States Patent Office
3,039,845
Patented June 19, 1962

3,039,845
METHOD OF REGENERATING ABSORBENT SOLUTIONS
Heinz Steinrötter and Harald Lorenz, Frankfurt am Main, Germany, assignors to Farbwerke Hoechst Aktiengesellschaft vormals Meister Lucius & Brüning, Frankfurt am Main, Germany, a corporation of Germany
Filed Apr. 17, 1959, Ser. No. 807,149
Claims priority, application Germany Apr. 25, 1958
2 Claims. (Cl. 23—2)

The present invention relates to a process for the removal of weak acids from solutions of alkali or organic solvents, and particularly to the desorption of charged absorbents. The present invention also relates to an apparatus for carrying out said process.

It is known to expel weak acids, for example hydrogen sulfide, from solutions of alkali such as sodium carbonate solution by means of air. According to a known method, air which has not been pretreated is used for this purpose. The condition of the air depends on the atmospheric conditions; in any case the heat content of the air is not sufficient for the supply of the desorption heat. The already unfavorably low temperature is further decreased by the abstraction of heat and the desorption necessitates such an amount of air that the process is uneconomical, at least when applied on an industrial scale.

It is also known that smaller quantities of air suffice if heated dry air is blown through the solution. In this case it has to be taken into account that the solution may be highly concentrated and the process has to be carried out at a temperature at which it is no longer possible to heat the air with cheap waste heat.

According to another proposal weak acids are expelled from solutions by using live steam as stripping agent. Owing to the thermal loss involved, this process is, however, uneconomical, especially when the desorbed gas is not suitable for a further treatment.

The present invention provides a process which enables gases which have been selectively absorbed from mixtures, in particular weak acids, to be desorbed from the charged absorbent by means of air while avoiding the aforesaid disadvantages of the known processes. The present invention permits of desorbing the charged absorbents at a temperature which is advantageous with a view to the amount of heat to be applied and favors the expulsion, and enables in particular weak acids to be removed from solutions of alkali or organic solvents in an economical manner. The process of the present invention is carried out as follows: Before entering the desorption zone, the stripping air is moistened and heated by bringing it into contact with the already discharged absorbent and then treated with hot water in order to heat it to a temperature which is about 5 to about 15° C. above the temperature of entry of the charged absorbent and to adjust the degree of saturation to 95 to 100%.

The final concentration of the discharged absorbent can be exactly controlled within wide limits by bringing a more or less strong branch current of the air current into contact with the discharged absorbent. In this manner it is, for example, achieved that the discharged absorbent returning to the absorber has the same salt concentration as the charged absorbent obtained from the absorber.

Owing to the low temperature at which the process is carried out the required amount of heat can be provided by waste heat. For heating the air and supplying the desorption heat, condensate or waste steam of low tension may, for example, be used.

The temperature of the outgoing air or mixture of gas, steam and air may be kept low and need only be about 1 to 3° C. above the temperature at which the charged absorbent enters the desorber.

An apparatus suitable for use in carrying out the process of this invention is illustrated diagrammatically by way of example in the accompanying drawing.

The apparatus consists of a two-part moistening column 1 of which the lower part 2 is provided with a spraying device 3 for the liquor and short air pipes 4, while the upper part 5 of column 1 is provided with a distributing device 6 for hot water. Between the upper and the lower part of column 1 a bottom 7 is disposed which is mounted with roofed-over vents.

The short air pipes 4 are connected by pipes 9 and 10 with a ventilating device 8. The upper branch pipe 9 of this ventilating device 8 contains a volume governor 11 of which the impulse transmitter 12 which operates in dependence on the concentration of the absorbent disposed in the absorbent collector 14.

The apparatus of the invention further comprises a water heater 15, a feed pump 16, a level control device 17 and pipes 18 which connect the outlet of bottom 7 via the level control device 17, the feed pump 16 and the water heater 15 with the distributing device 6.

The desorption column is designated by 19, a feed pipe for the charged absorbent is represented at 20, a distributor for the charged absorbent is designated by 21, a short pipe for the escaping gas is denoted by 22, a feed pipe for the treated air is represented at 23, a delivery pipe for the discharged absorbent is designated by 24 and a feed pump is designated by 25.

When the apparatus of the invention is working, the charged solution is continuously introduced into the desorber 19 through pipe 20. From the distributor 21 this solution trickles or is sprayed on the layer of packing material. Air which has been heated to a temperature of 5 to 15° C. above the temperature of the entering absorbent and has a degree of saturation of 95 to 100% rises in counter-current to the liquid which flows through the packing material to the bottom of the column. The mixture leaving the desorber through short pipe 22 may be blown off or subjected to a treatment for recovering the expelled gas.

The discharged absorbent is passed through pipe 24 by means of pump 25 into the lower part 2 of the moistening column 1 and distributed by distributor 3 over the layer of packing material. The solution which has been diluted in the desorber by the condensation of the moisture contained in the air, flows in counter-current to the portion of air entering through pipe 10 and is thereby concentrated. The amount of air entering through the lower short air pipe 4 can be indirectly controlled by means of volume governor 11 disposed in the upper branch pipe 9 of pipe 10. In this manner the final concentration of the absorbent can be adjusted to a pre-determined value, for example the starting concentration in the desorber. The impulse transmitter 12 is disposed in a collector as shown in the accompanying drawing.

The air entering through pipe 9 has no influence on the concentration of the absorbent. This air flows together with the air leaving the layer of packing material through the vent or vents of bottom 7 into the upper part 5 of the moistening column. The air moves upwards through the layer of packing material of the upper part 5 of the moistening column and is thereby heated and saturated. The final temperature and the final moisture content of the air leaving the moistening column depend only on the amount of water used and the temperature of the water if the layer of packing material is sufficiently thick. The amount and temperature of water necessary for a desired final condition of the air can be adjusted by known measures, for example by temperature and moisture content regulators. When a small excess of water is used this adjustment may be effected by using only a temperature regulator of which the sensitive element may be disposed, for example, in the feed pipe for the air 23 or the controlling element of which may be disposed in the energy feed line of the heat exchanger.

The water temperature can be regulated in a particularly simple manner by conducting the moistening water in a cycle as shown in the accompanying drawing.

The water leaving the layer of packing material of the upper part 5 of the column 1 is prevented from penetrating into the lower part 2 by bottom 7 and flows to the level control device 17 where the consumed portion of water is replaced. The water is replaced, for example, in dependence on the level of the liquid on bottom 7. The water is conducted by pump 16 via heat exchagner 15 and distributor 6 to the upper part 5 of the moistening column 1 in order to be again circulated. Instead of the layer of packing material, bubble trays or other known kinds of bottoms may be used in the desorption and moistening columns.

The process and apparatus of the present invention are particularly suitable for the expulsion of $CO_2$, $H_2S$ and HCN. It may, however, be also generally used for the removal of weak acids from solutions of alkali or organic solvents.

The following example serves to illustrate the invention but it is not intended to limit it thereto.

*Example*

In an absorption plant 131 m.³/h. of K-taurinate charged with 2660 Nm.³ (normal cubic meter at 0° C. and 1 atmosphere) of $CO_2$ are obtained in a solution of 17% strength having a temperature of 70° C. This absorbent is subjected to a desorption with air and returned in a concentration of 17% strength to the absorption plant.

The absorbent is fed to the head of a desorption column, for example a packed column having a diameter of 4.5 m. and a height of packed layer of packed material of 10 m. At the same time 34,000 Nm.³/h. (normal cubic meter at 0° C. and 1 atmosphere per hour) of stripping air which before entering the desorption column have been heated to 77° C. and adjusted to a degree of saturation of 97% travel from the bottom to the head of the column.

Before entering the desorption column, the stripping air is conducted through a moistening apparatus of the kind described above, having a diameter of 4.5 m. and containing layers of packing material having a height of 2.5 m. each.

The solution leaving the desorber has a temperature of 76° C. Owing to the condensation of a part of the steam contained in the stripping air, the solution has absorbed about 4 m.³/h. of water. This diluted solution is distributed over the lower layer of packing material and concentrated by means of the air flowing in counter-current. The final concentration is kept within narrow limits at 17% by means of the quantity of air controlled by the volume governor. The final temperature of the solution is about 47° C.

The layer of packing material in the upper part of the moistening column is charged with 440 m./³h. of water at 85° C. The water cools down to 65° C. under the influence of the air; it is removed at a position above the intermediate bottom, passed to the level control device for replacement of the consumed quantity of water and returned via the heat exchanger which is operated with waste heat from the absorption plant, to the upper part of the moistening column. By changing the quantitative proportion and the concentration the discharged absorbent may be heated without difficulty to a different temperature and adjusted to a different degree of dilution than those described in the preceding example.

We claim:

1. A process for stripping an acid gas from a charged liquid absorbent containing said gas and vaporizing water from discharged liquid absorbent from which said gas has been stripped, which comprises passing at least a portion of a stream of air in contact with a stream of discharged absorbent to vaporize vapor from the absorbent and humidify the air; heating and further humidifying, to a temperature about 5 to about 15° C. above the temperature of charged absorbent and a relative humidity of about 95 to 100%, the stream of air by contact with warm water; and passing said stream of heated and humidified air in countercurrent contact with a stream of the charged absorbent.

2. A process as defined in claim 1 wherein the portion of the stream of air passed in contact with discharged absorbent is the amount required to restore the initial water content of the absorbent.

References Cited in the file of this patent

UNITED STATES PATENTS

| 2,585,638 | Drew | Feb. 12, 1952 |
| 2,615,787 | Randlett | Oct. 28, 1952 |
| 2,717,202 | Bailey | Sept. 6, 1955 |
| 2,733,979 | Haensel | Feb. 7, 1956 |

FOREIGN PATENTS

| 786,669 | Great Britain | Nov. 20, 1957 |